United States Patent [19]
Grover et al.

[11] Patent Number: 5,416,488
[45] Date of Patent: May 16, 1995

[54] RADAR RETURN SIGNAL PROCESSING METHOD

[75] Inventors: Richard K. Grover, Scottsdale; Eric J. Carlson, Mesa; Michael S. Kronick, Phoenix, all of

[73] Assignee: Motorola, Inc., Schaumburg, Ill.

[21] Appl. No.: 173,235

[22] Filed: Dec. 27, 1993

[51] Int. Cl.$^6$ ............................................. G01S 13/00
[52] U.S. Cl. ................................. 342/159; 342/109
[58] Field of Search .............. 342/159, 109, 110, 111, 342/91, 93

[56] References Cited

U.S. PATENT DOCUMENTS

| | | | |
|---|---|---|---|
| 3,500,404 | 3/1970 | Anderson et al. | 342/159 |
| 3,968,490 | 7/1976 | Gostin | 343/7.7 |
| 4,559,537 | 12/1985 | Pearson, Jr. et al. | 342/159 |
| 4,654,665 | 3/1987 | Kiuchi et al. | 342/160 |
| 4,742,353 | 5/1988 | D'Addio et al. | 342/159 |
| 4,839,655 | 6/1989 | Kiuchi | 342/93 |
| 4,970,660 | 11/1990 | Marchant | 364/517 |
| 5,038,145 | 8/1991 | DeCesare et al. | 342/93 |
| 5,235,338 | 8/1993 | Hsiao et al. | 342/109 |

OTHER PUBLICATIONS

An article entitled "A Variably Trimmed Mean CFAR Radar Detector" by I. Ozgunes, P. P. Ghandi, S. A. Kassam, IEEE Transactions on Aerospace and Electronic Systems, vol. 28, No. 4, Oct. 1992.

*Primary Examiner*—Mark Hellner
*Attorney, Agent, or Firm*—Frank J. Bogacz

[57] ABSTRACT

A radar system (10) forms a range-Doppler map (28). A CFAR processor (57) determines a threshold (60) and evaluates the map (28) to identify potential targets whose amplitudes are greater than the threshold. The potential targets are evaluated to determine (88) whether they form substantial peaks for the Doppler bins (32) where they are located, and to determine (98) whether they resemble noise more than targets. In addition, the potential targets are evaluated to determine (114) whether they are most likely the result of range sidelobes and to determine (118) whether they are most likely images of targets rather than targets. When any of these situations are detected, the potential targets are removed from a potential target list (50).

28 Claims, 7 Drawing Sheets

RADAR RETURN SIGNAL PROCESSING METHOD

TECHNICAL FIELD OF THE INVENTION

The present invention relates generally to radar systems and methods. More specifically, the present invention relates to techniques for processing radar return signals to achieve a constant false alarm rate (CFAR).

BACKGROUND OF THE INVENTION

A common problem with conventional radar systems has been the processing of radar return signals to distinguish targets from clutter. A target represents an object that the radar system is intended to detect and about which the radar system provides an indication, such as a "blip" or icon on a radar screen. Clutter represents unwanted indications that are not considered targets.

For the purposes of the present invention, two forms of clutter may produce unwanted indications. Active clutter results from object echoes and jamming signals. Objects whose echoes may cause active clutter include the ground, buildings, the sea, rain, chaff, grass, birds, and the like. Jamming signals are actively and intentionally transmitted in an attempt to trick a radar receiver. On the other hand, passive clutter need not result from any object or active attempt to trick a radar receiver. Rather, passive clutter may result from noise, unintentional interference, and signal processing techniques carried out in a radar receiver.

Conventional radar systems employ hardware receiver designs that generate a range-Doppler or range-range-rate map in which a radar return signal is broken into time components, referred to as range gates herein, and into frequency components, referred to as Doppler bins herein. Each cell in this map characterizes the amplitude of the return signal for the cell's range gate and Doppler bin. Conventional radar system hardware receiver designs limit the amount of passive clutter that appears in this map to acceptable levels. However, the map may include active clutter along with targets. A CFAR processing technique then calculates one or more thresholds based upon the map, and each cell's amplitude is compared to an appropriate threshold times a user-supplied constant. The user may set this constant at a lower level to increase the CFAR or at a higher level to decrease the CFAR. The CFAR processing technique that calculates thresholds exerts a large influence over the radar system results because this algorithm forms the basis for distinguishing targets from clutter, or at least from active clutter.

Unfortunately, the known solutions for minimizing passive clutter in the range-Doppler map involve expensive hardware that often requires periodic error-prone and time consuming alignment and adjustment procedures, complex and heavy equipment, and components that consume an excessive amount of power. While these burdens may be of little importance in some applications, they pose serious obstacles to a portable, battery powered, relatively inexpensive radar unit. Consequently, portable radar units often opt for simple, low power, light weight radar receiver units that place a greater amount of passive clutter in a range-Doppler map.

The conventional CFAR processing techniques are not geared toward distinguishing the spurious signals caused by passive clutter. Consequently, conventional CFAR techniques fail to adequately distinguish targets from both active and passive clutter. In particular, conventional CFAR techniques often fail to identify an unusually high level spurious noise signal, image signal, range sidelobe, or Doppler sidelobe. Thus, conventional portable radar systems too often indicate passive clutter.

SUMMARY OF THE INVENTION

Accordingly, it is an advantage of the present invention that an improved radar return signal processing method is provided.

Another advantage of the present invention is that a CFAR processing technique is provided that identifies spurious signals that are likely to be considered passive clutter.

Another advantage is that the present invention processes a range-Doppler map to distinguish targets from both active and passive clutter.

Another advantage is that the present invention processes a range-Doppler map to detect spurious signals that are likely to have been caused by range sidelobes of a pulse compression network.

Another advantage is that the present invention processes a range-Doppler map to detect spurious signals that are likely to have been caused by a target Doppler image.

Another advantage is that the present invention processes a range-Doppler map to detect spurious signals that are likely to be noise rather than a target.

The above and other advantages of the present invention are carried out in one form by a method for distinguishing targets from active clutter and from passive clutter in a radar system. The method calls for forming a range-Doppler map from a return signal generated by a radar receiver. The map has a multiplicity of map cells wherein each map cell characterizes an amplitude component of the return signal at one of a plurality of range gates and one of a plurality of Doppler bins. A list of potential targets is formed from the map. The list identifies subject map cells whose amplitudes exceed a threshold value. Amplitudes of said subject cells are evaluated against amplitudes of selected ones of the map cells to identify subject cells whose amplitudes are likely to have resulted from passive clutter.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
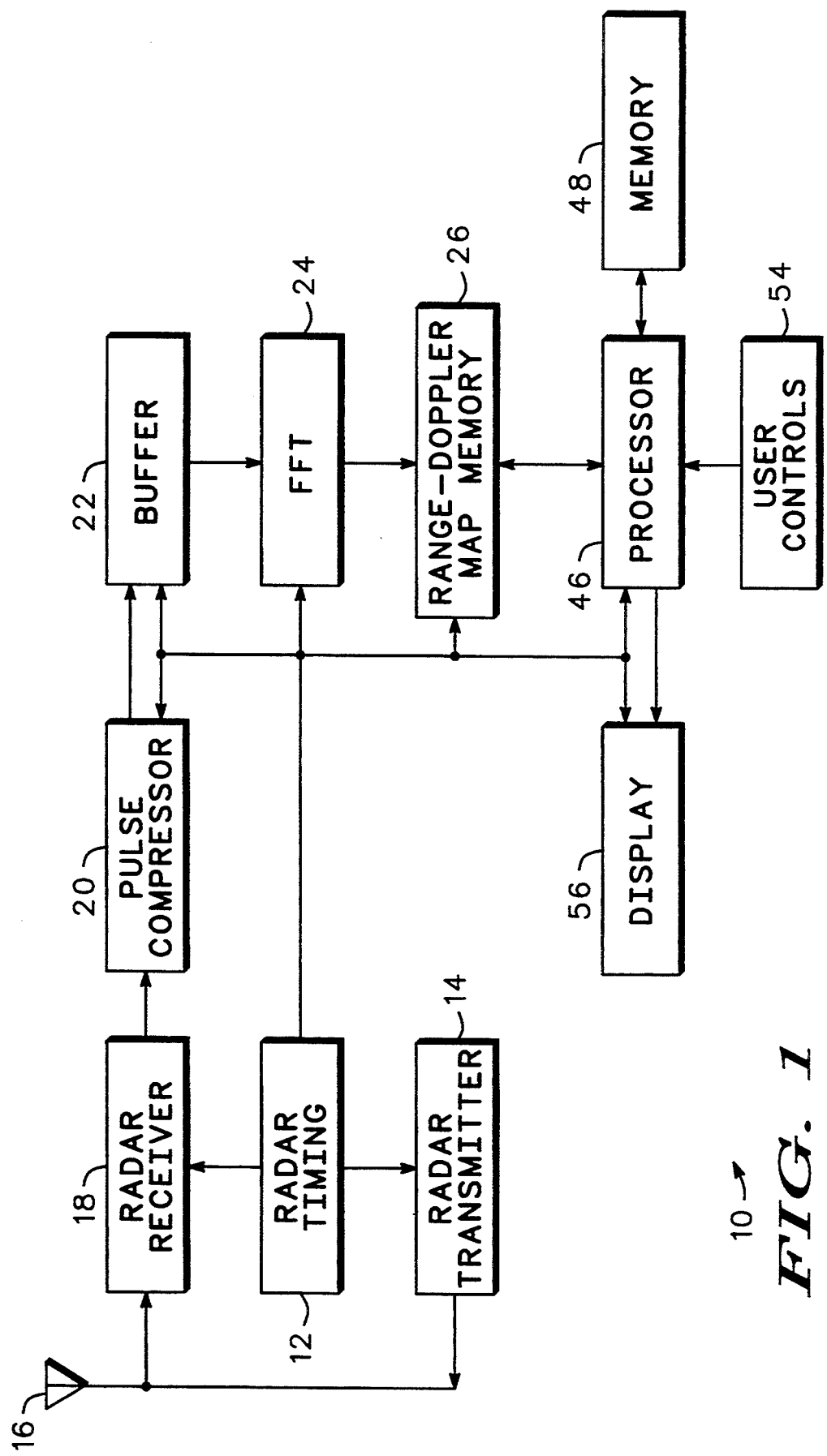
FIG. 1 shows a block diagram of a radar system.

FIG. 1 shows a block diagram of a pulse Doppler radar system 10. System 10 includes a radar timing section 12. Timing section 12 includes oscillators (not shown) which are used in modulating and demodulating radar signals and includes clock circuits (not shown) that control radar pulse width, pulse repetition frequency (PRF) and the like. Timing section 12 couples to a radar transmitter 14, and transmitter 14 couples to an antenna 16. Accordingly, under the control of timing section 12, radar system 10 transmits radar pulses in a manner well understood to those skilled in the art.

Radar return signals represent echoes from the radar pulses transmitted from radar system 10. However, these echoes may be corrupted by multipatching, and the radar return signals may additionally include noise and interfering signals that are independent of the transmitted radar pulses. A radar return signal is received at antenna 16, which couples to a radar receiver 18. Radar receiver 18 also couples to and is controlled by radar timing section 12. Radar receiver 18 converts the return signal to baseband in a conventional manner. Hence, receiver 18 may add additional noise to the return signal, and the return signal may be further corrupted by the formation of a target image within receiver 18. The image may, for example, be formed by imprecisely balanced I and Q quadrature phase and/or amplitude signals within receiver 18. The output from receiver 18 may be converted to a digital signal, or analog-to-digital conversion may take place later in the signal processing path.

Radar receiver 18 couples to a pulse compressor 20, which is also coupled to and controlled by timing section 12. Pulse compressor 20 may include front-end filtering (not shown) to remove unwanted harmonics of the return signal pulses. Nevertheless, after pulse compression the return signal may be further corrupted by smearing the pulses in time to generate range sidelobes, which are discussed below.

The radar return signal output from pulse compressor 20 is collected in a buffer 22, which also couples to and is controlled by timing section 12. An output from buffer 22 couples to an input of fast Fourier transform (FFT) processor 24. While FFT processor 24 may include some degree of input weighting (not shown) to limit the amount for which the FFT results are smeared in frequency, some smearing may nevertheless occur. This smearing causes Doppler sidelobes, discussed below.

Figures 2, 3, 4:
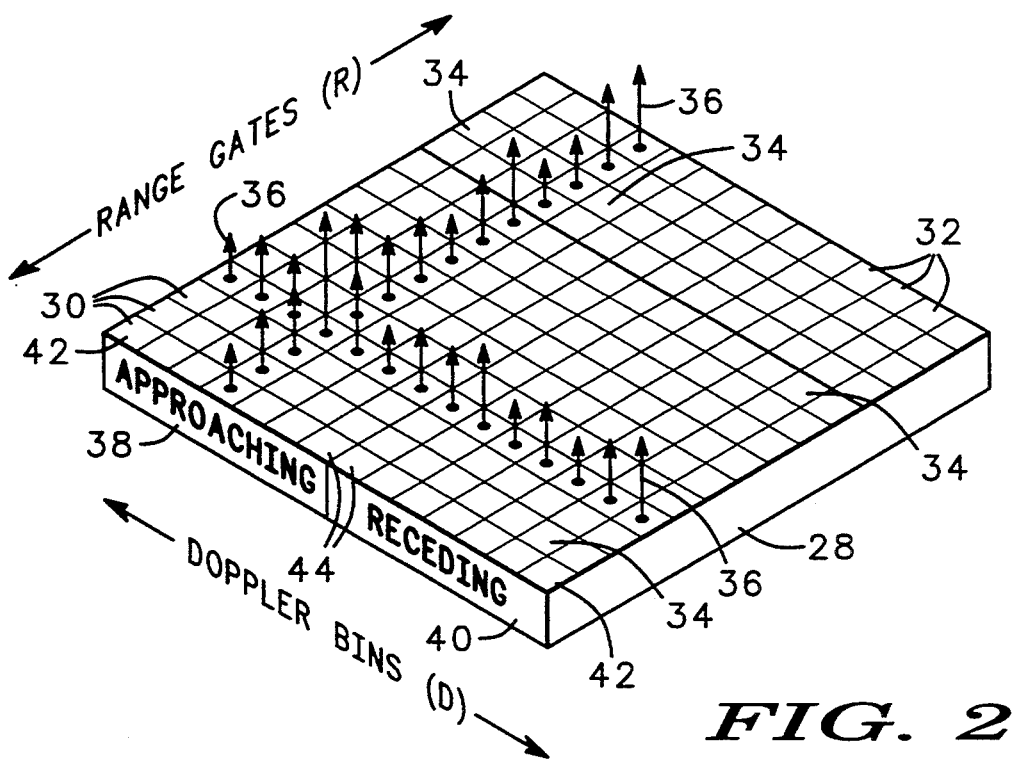
FIG. 2 graphically depicts an exemplary range-Doppler map formed in a memory of the radar system.
FIG. 3 shows a block diagram of a potential target list maintained in a memory of the radar system.
FIG. 4 shows a block diagram of a Doppler peak array maintained in a memory of the radar system.

FFT processor 24 operates upon the return signal samples collected over many pulses. The FFT results are collected in a range-Doppler mad memory 26. FIG. 2 graphically depicts data recorded in an exemplary range-Doppler map 28 formed in memory 26. As illustrated in FIG. 2, map 28 provides a three-dimensional representation of the radar return signal. Range gates 30 are arranged along one dimension of map 28, and Doppler bins 32 are arranged along another dimension. Those skilled in the art will appreciate that range gates 30 characterize the timing of the return signal and that Doppler bins 32 characterize frequency components of the return signal. A cell 34 resides at the intersection between a range gate 30 and a Doppler bin 32. While FIG. 2 shows only a few range gates 30 and Doppler bins 32, map 28 may desirably include many more gates 30 and bins 32 than are shown. For example, the preferred embodiment includes 128 range gates 30 and 128 Doppler bins 32 for a total of over 16,000 cells 34.

The third dimension of map 28 depicts amplitude for the components of the return signal that are characterized by the respective range gates 30 and Doppler bins 32. The amplitude reflects the strength or power of the return signal for the timing and frequency characteristics of each cell 34 of map 28. FIG. 2 illustrates these amplitude components as amplitude vectors, or simply amplitudes 36, of varying magnitude. For clarity, FIG. 2 illustrates amplitudes 36 in connection with only a few of cells 34. However, those skilled in the art will understand that each cell 34 may define an amplitude 36 even if that amplitude has zero magnitude.

Doppler bins 32 may be grouped into approaching bins 38 and receding bins 40. Minimum Doppler bins 42 describe slow moving targets. Maximum Doppler bins 44 describe fast moving targets. FFT processor 24 may desirably arrange map 28 so that minimum bins 42 reside near boundaries of map 28 and maximum bins 44 reside adjacent to one another in the center of map 28. Moreover, those skilled in the art will appreciate that Doppler bins 32 around a zero Doppler may include a significant amount of active clutter due to stationary objects such as buildings, trees, mountains, and the like. Such bins are desirably omitted or ignored from further processing of the return signal. Due to omitting or ignoring such bins, minimum Doppler bins 42 need not reflect a zero Doppler.

Referring back to FIG. 1, a processor 46 couples to map memory 26 and is configured to process map 28 (see FIG. 2). Processor 46 additionally couples to and is to some degree controlled by timing section 12. Processor 46 couples to a memory 48. Memory 48 is configured to store programming instructions which define the processes, procedures, tasks, and operations performed by processor 46 and to retain tables, databases, lists, and arrays used by processor 46.

Generally speaking, processor 46 and memory 48 are configured to form a potential target list 50, an exemplary block diagram of which is depicted in FIG. 3, from the data contained in map 28 (see FIG. 2). List 50 may be stored in memory 48. Processor 46 then evaluates potential target list 50 to identify and filter out potential targets that are likely to have resulted from passive clutter. In identifying the potential targets that are likely to have resulted from passive clutter, processor 46 generates a Doppler peak array 52, an exemplary block diagram of which is depicted in FIG. 4, from the data contained in map 28 (see FIG. 2) and potential target list 50 (see FIG. 3). Array 52 may also be stored in memory 48. These processing operations are discussed in more detail below.

User controls 54 include switches, knobs, buttons, and similar user input devices that a user of radar system 10 may use to control the operation of system 10. In particular, a user may manipulate controls 54 to set a constant false alarm rate (CFAR). User controls 54 couple to processor 46.

A display 56 couples to processor 46 and to timing section 12. Under the control of processor 46 and timing section 12, display 56 provides visual indications such as "blips", icons, and the like, that the user may interpret as being targets.

Processor 46 and radar system 10 may perform many tasks which are routine in the operation of processor-controlled radar systems but which are not related to the present invention. While such tasks may not be specifically discussed herein, those skilled in the art will appreciate that such tasks may be included or omitted as required for a particular application. On the other hand, the flow charts presented in FIGS. 5-8 relate to the present invention. The flow charts presented in FIGS. 5-8 describe operations performed primarily by processor 46 under the control of programming instructions recorded in memory 48.

Figure 5:
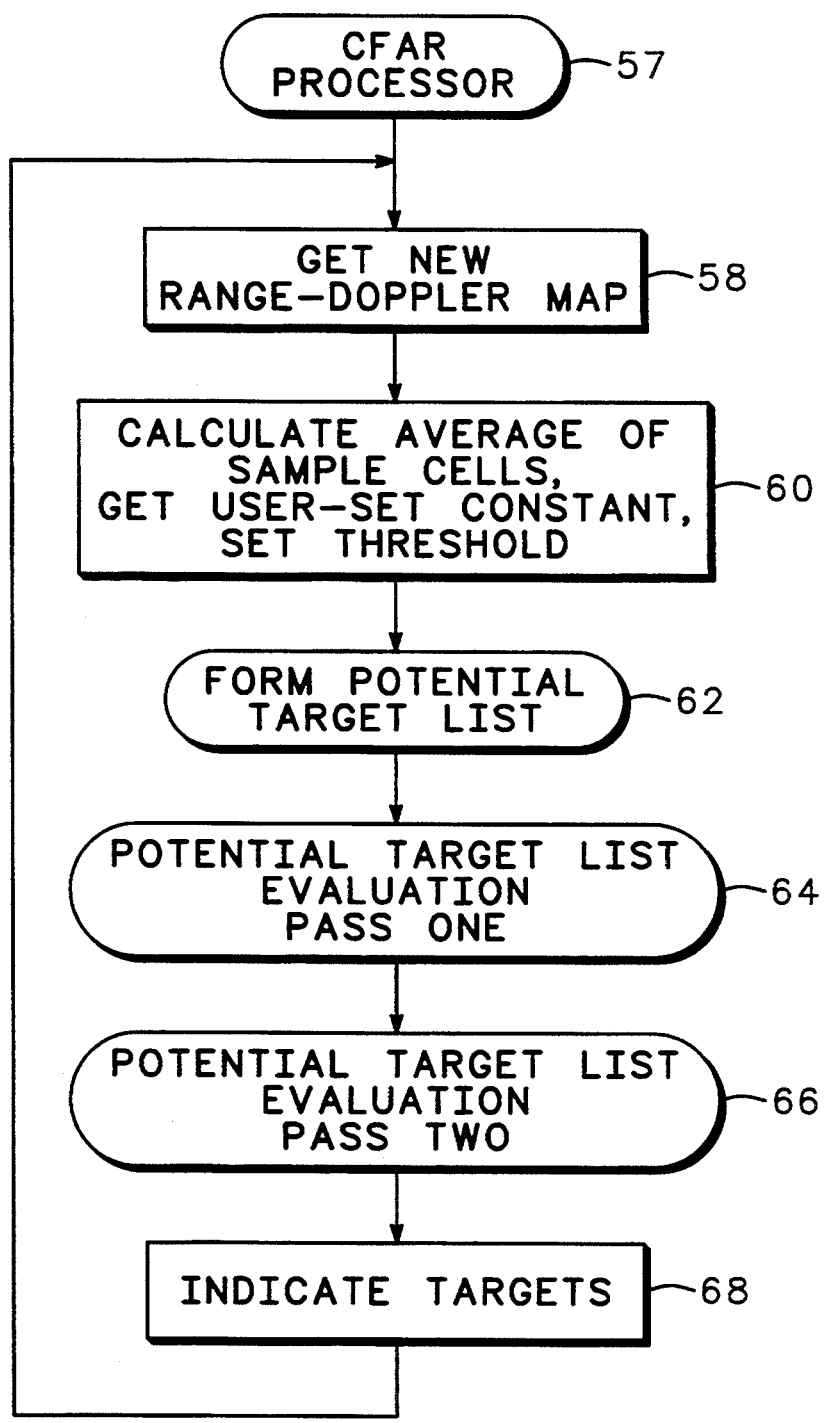
FIG. 5 shows a flow chart of a CFAR processor performed by the radar system.

FIG. 5 shows a flow chart of a CFAR processor 57 performed by radar system 10 (see FIG. 1). As illustrated in FIG. 5, CFAR processor 57 runs in a continuous loop. Each pass through the loop processes a single range-Doppler map 28 (see FIG. 2). Radar system 10 performs a task 58 to get a new range-Doppler map 28.

After task 58, a task 60 is performed to calculate a threshold which is used to set the basic CFAR level for radar system 10. In the preferred embodiment of radar system 10, task 60 obtains a sample set of cells 34 (see FIG. 2) from map 28 and calculates an average over the sample. The average is determined using the cells' amplitudes 36 (see FIG. 2). This sample set contains a smaller number of cells 34 than the total number included in map 28, and the cells 34 included in the sample need not be localized in any particular area of map 28 but are distributed throughout map 28 so as to provide a statistically valid sample. In the preferred embodiment, the sample includes 98 of cells 34 of which the largest eight are discarded, chosen to minimize the effects due to large signals in the same Doppler cell.

In addition, task 60 gets a user-set constant from user controls 54 (see FIG. 1). Based upon these calculations, the threshold is calculated as follows:

$$TH = AVG*K/10,$$

where:
"TH" is the calculated threshold,
"AVG" is the average amplitude over the sample,
"K" is the user-set constant; and
"TH" is constrained to be greater than a minimum value where 10 is a preferred minimum value.

This threshold is used for the processing of map 28 that occurs in a single iteration of the loop illustrated in FIG. 5. The particular calculations performed by radar system 10 in arriving at the threshold are desirable in the application in which the preferred embodiment of the present invention is used. Since the threshold is based upon only a sample of cells 34, only a relatively small amount of processing power needs to be dedicated to obtaining a threshold. This promotes the use of low power and relatively simple processing circuits which are appropriate for portable equipment.

However, those skilled in the art will appreciate that other techniques for calculating a threshold that achieves CFAR at a low signal to noise ratio are used in other radar applications. While such other threshold calculation techniques may require additional processing power, they may work acceptably well for task 60 in many applications.

After task 60, a procedure 62 is performed to form potential target list 50 (see FIG. 3). Procedure 62 is discussed in more detail below in connection with FIG. 6. After procedure 62, a procedure 64 performs a first pass evaluation of potential target list 50 formed above in procedure 62. Procedure 64 is discussed in more detail below in connection with FIG. 7. After procedure 64, a procedure 66 performs a second pass evaluation of potential target list 50 formed above in procedure 62 and possibly modified above in procedure 64. The target evaluation procedure can be prioritized to increment in range or in Doppler. The discussion below describes the Doppler priority method, but the disclosure includes the procedure wherein range is the preferred priority discussed later in FIG. 9. Procedure 66 is discussed in more detail below in connection with FIG. 8.

After procedure 66, a task 68 indicates targets. Task 68 indicates targets in response to potential target list 50 after procedures 62, 64, and 66 have filtered out potential targets which are likely to have been caused by passive clutter. Task 68 indicates targets through display 56 (see FIG. 1) in the preferred embodiment of the present invention using conventional radar target indication techniques. After task 68, program control loops back to task 58 to get and process another range-Doppler map 28 (see FIG. 2).

Figure 6:
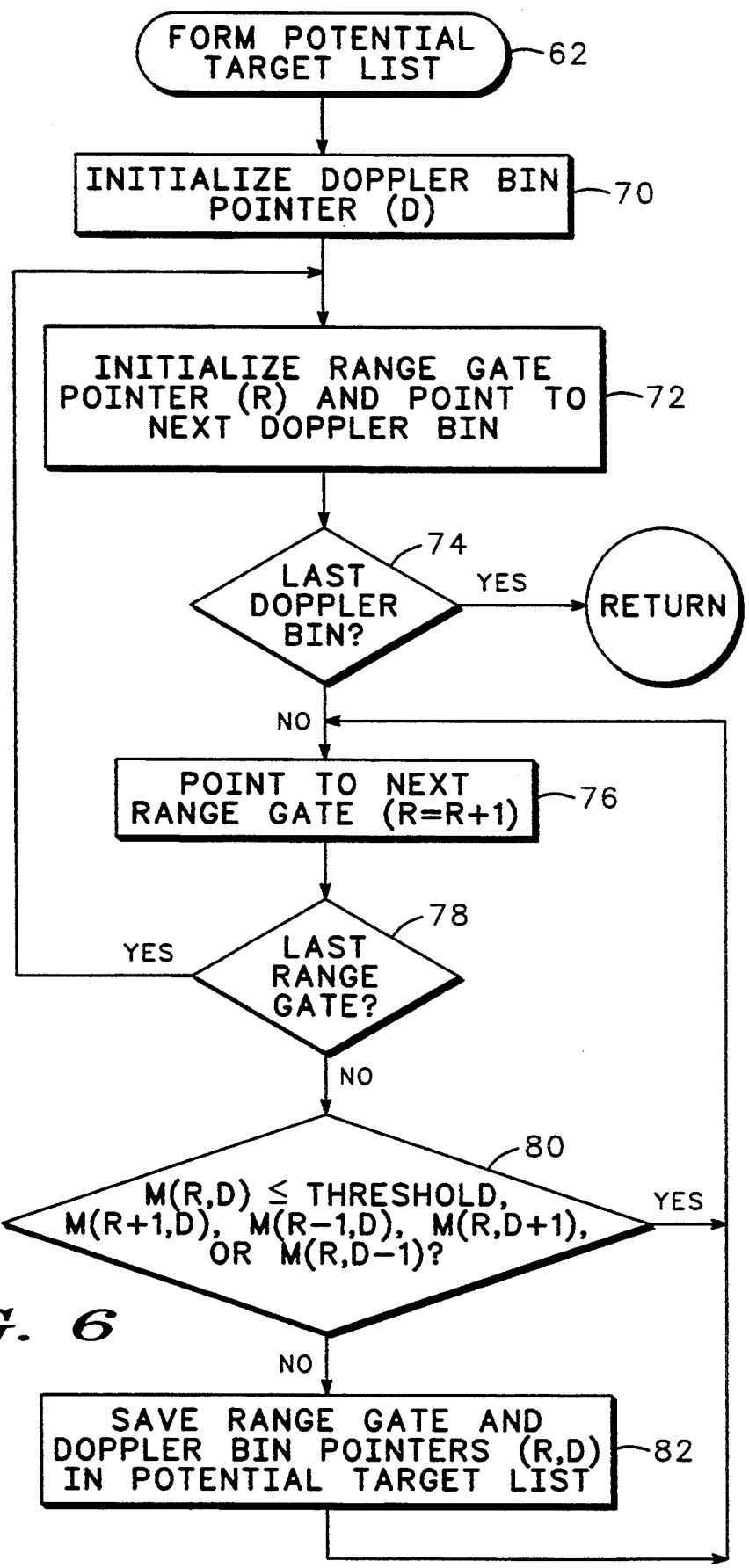
FIG. 6 shows a flow chart of a procedure that the radar system uses to form the potential target list.

FIG. 6 shows a flow chart of procedure 62, within which radar system 10 forms potential target list 50 (see FIG. 3). With reference to FIGS. 2 and 6, procedure 62 preferably evaluates all cells 34 within a single Doppler bin 32 before continuing on to evaluate cells 34 in another Doppler bin 32. For the sake of clarity, FIG. 6 illustrates this process as cycling from a first Doppler bin 32 to a last Doppler bin 32 until all cells 34 in map 28 are evaluated. However, in practice the preferred embodiment evaluates approaching bins 38 and receding bins 40 separately, with each group of bins 38 and 40 being evaluated from maximum Dopplers 44 to minimum Dopplers 42. These and other implementation details may be varied as needed from application to application by those skilled in the art.

Thus, procedure 62 includes a task 70 to initialize a Doppler bin pointer (D), such as to a number that is beyond maximum Doppler 44. Next, a task 72 initializes a range gate pointer (R) to point to a first range gate 30, which may, for example, be the first or second range gate 30 in map 28. Task 72 also alters the Doppler bin pointer (D) to point to the next Doppler bin, which may be a maximum Doppler bin 44 for the first iteration of a loop implemented by procedure 62. After task 72, a query task 74 determines whether the Doppler bin indicated by the Doppler bin pointer (D) is beyond a last Doppler bin, which, for example, may be minimum Doppler 42. If query task 74 determines that the Doppler bin pointer (D) is beyond the last Doppler bin, all cells 34 within map 28 have been evaluated, and program control exits procedure 62 and proceeds to procedure 64, as shown in FIG. 5.

So long as the Doppler bin pointer (D) does not point beyond the last Doppler bin, a task 76 is performed to point to a next range gate. For example, the range gate pointer (R), initialized above in task 72, may be incremented by one. After task 76, a query task 78 determines whether the range gate pointer (R) now points beyond the last range gate to be evaluated from map 28. If the range gate pointer (R) points beyond the last range gate 30, program control loops back to task 72, where the range gate pointer (R) will be re-initialized and the Doppler bin pointer (D) will be adjusted to point to a new Doppler bin 32.

When task 78 determines that the range gate pointer (R) points to a legitimate range gate, a query task 80 is performed to evaluate the cell 34 pointed at by the Doppler bin pointer (D) and the range gate pointer (R). The amplitude 36 of this cell 34 in map 28, referred to as M(R,D) in FIG. 6, is compared to the threshold calculated above in procedure 60 (see FIG. 5) and to the amplitudes 36 of adjacent cells 34. Generally, task 80 determines whether amplitude M(R,D) is greater than the threshold and is a local peak amplitude.

In particular, if amplitude M(R,D) is less than or equal to the threshold, program control loops back to task 76 to examine the next cell 34. Likewise, if amplitude M(R,D) is less than or equal to the amplitude 36 of the next cell 34 in the same Doppler bin 32, referred to as M(R+1,D) in FIG. 6, program control loops back to task 76. If amplitude M(R,D) is less than or equal to the amplitude 36 of the previous cell 34 in the same Doppler bin 32, referred to as M(R−1,D) in FIG. 6, program control loops back to task 76. If amplitude M(R,D) is less than or equal to the amplitude 36 of the cell 34 at the same range gate 30 but the next Doppler bin 32, referred to as M(R,D+1) in FIG. 6, program control loops back to task 76. Or, if amplitude M(R,D) is less than or equal to the amplitude 36 of the cell 34 at the same range gate 30 but the previous Doppler bin 32, referred to as M(R,D−1) in FIG. 6, program control loops back to task 76.

However, if M(R,D) is greater than the threshold, greater than M(R+1,D), greater than M(R−1,D), greater than M(R,D+1), and greater than M(R,D−1), then procedure 62 performs a task 82. Task 82 saves the range gate and Doppler bin pointers (R,D) in potential target list 50 (see FIG. 3). After task 82, program control loops back to task 76 to examine the next cell 34.

Consequently, procedure 62 evaluates all cells 34 from map 28. Only a few of these cells 34 are considered potential targets by procedure 62. These few cells 34 are referred to as subject cells below, and their identities are recorded in potential target list 50 (see FIG. 3). Any cell 34 whose amplitude 36 is below the threshold is omitted from potential target list 50. Likewise, if amplitudes 36 are sloping upward or downward in range or Doppler, rather than peaked or maximized, at a cell 34 being evaluated, that cell 34 is omitted from potential target list 50.

Figure 7:
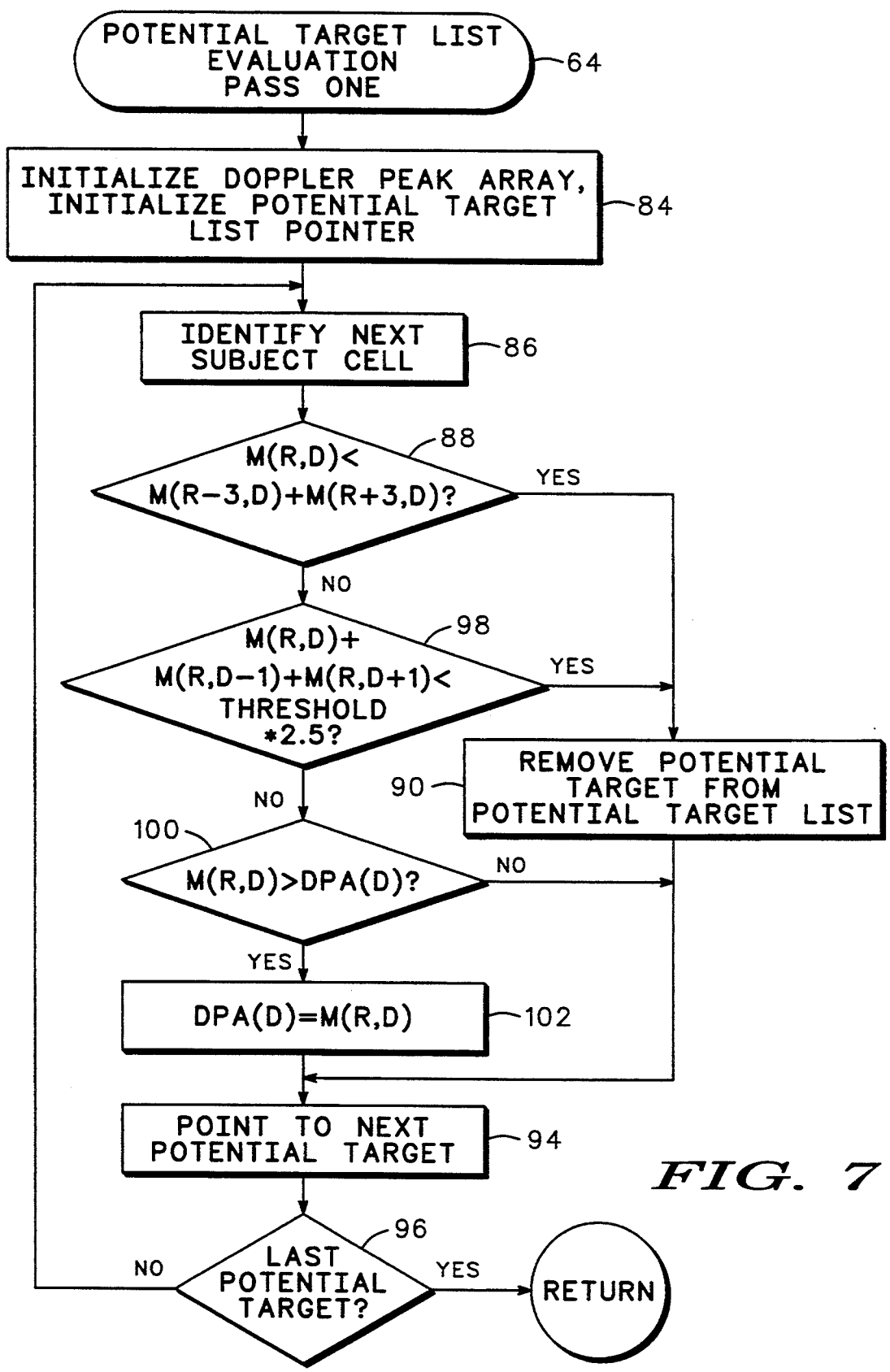
FIG. 7 shows a flow chart of a procedure that the radar system uses to make a first pass evaluation of the potential target list.

FIG. 7 shows a flow chart of procedure 64, which radar system 10 uses in making a first pass evaluation of potential target list 50 (see FIG. 3). Referring to FIGS. 2 and 7, procedure 64 performs a task 84 to initialize Doppler peak array 52 (see FIG. 4). Array 52 may be initialized, for example, by setting all its values to zero. In addition, task 84 initializes a potential target list pointer. The potential target list pointer may, for example, be set to point to the first item in potential target list 50 (see FIG. 3). After task 84, a task 86 identifies the next subject cell. The subject cell is the cell 34 whose range gate and Doppler bin coordinates (R,D) are stored at the location in potential target list 50 indexed by the potential target list pointer. This cell 34 is considered a potential target at this point.

After task 86, a query task 88 evaluates the subject cell to determine whether its amplitude 36 represents a substantial amplitude peak. In particular, the amplitude M(R,D) of the subject cell is compared with the sum of the amplitudes for cells 34 spaced at least two and preferably three range gates away from the subject cell in map 28 but in the same Doppler bin 32. FIG. 7 refers to the amplitudes for these spaced away cells as M(R−3,D) and M(R+3,D). If M(R,D) is less than M(R−3,D) plus M(R+3,D), then the potential target does not peak up abruptly in its Doppler bin 32 and is not considered a substantial peak. Rather, the potential target represents the peak of a local area within map 28 of relatively high amplitudes. Targets are typically characterized by substantial peaks, whereas passive clutter caused by unintentional interference is often characterized by such local areas of relatively high amplitudes within a Doppler bin 32. Thus, when the subject cell fails to exhibit a substantial peak for a given Doppler bin 32, radar system 10 concludes that the potential target is most likely caused by passive clutter, and program control proceeds from task 88 to a task 90.

Task 90 removes the potential target from potential target list 50 (see FIG. 3). The potential target list 50 may be adjusted to remove the potential target by clearing or resetting the coordinates for the subject cell. After task 90, program control proceeds to a task 94. Task 94 adjusts the potential target list pointer to index the next potential target in list 50. After task 94, a query task 96 determines whether the last potential target identified in list 50 has been evaluated by procedure 64. So long as additional potential targets remain to be evaluated, program control loops back to task 86 to evaluate the next subject cell. After the last potential target has been evaluated, program control leaves procedure 64 and proceeds to procedure 66, as indicated in FIG. 5.

Referring back to task 88, when the subject cell being evaluated is found to be a substantial peak, a query task 98 is performed to further qualify the potential target. Generally speaking, task 98 determines whether the potential target looks more like a target or noise. A characteristic of FFT processor 24 (see FIG. 1) is that it smears the return from a target into several adjacent Doppler bins 32 at the same range gate. Moreover, the motion of a given target may cause the target's return signal to legitimately straddle two Doppler bins 32. As an illustration, around 50% of the return signal's energy may be characterized in one Doppler bin 32 while around 25% of the signal's energy may be characterized in each of two adjacent Doppler bins 32 due to the FFT weighting function. Thus, for various reasons, a target's entire return signal may appear in a few adjacent Doppler bins. On the other hand, noise is typically distributed more randomly and does not exhibit this characteristic.

Task 98 compares the sum of the amplitude M(R,D) of the subject cell and the amplitudes for the two cells 34 adjacent to the subject cell in map 28 at the same range gate 30 with the threshold. FIG. 7 refers to the amplitudes for the adjacent cells as M(R,D−1) and M(R,D+1). If this sum fails to exceed the threshold by a predetermined amount, the potential target most likely results from passive clutter caused by noise rather than a from a target. This predetermined amount is at least twice the threshold and preferably around two and one-half times the threshold in the preferred embodiments of the present invention. When the subject cell appears to be passive clutter caused by noise, program control proceeds from task 98 to task 90 to remove the potential target from potential target list 50 (see FIG. 3) and to proceed toward evaluating the next subject cell.

When task 98 determines that the subject cell appears to result from a target rather than passive clutter, a query task 100 determines whether the amplitude M(R,D) of the subject cell is greater than the value recorded in Doppler peak array 52 (see FIG. 4) for the subject cell's Doppler bin 32. FIG. 7 refers to this value as DPA(D). If M(R,D) is less than or equal to DPA(D), program control proceeds to task 94 to evaluate the next subject cell. If M(R,D) is greater than DPA(D), a task 102 saves M(R,D) in Doppler peak array 52 at the location indexed by Doppler bin (D). After task 102, program control proceeds to task 94 to evaluate the next subject cell.

Accordingly, after completion of procedure 64, some of the potential targets identified in potential target list 50 (see FIG. 3) may be filtered out. In particular, subject cells that are not substantial peaks for their Doppler bins are filtered out because they are most likely caused by interference rather than targets. Likewise, subject cells that, when considered with cells in the same range gate 30 but adjacent Doppler bins 32, exhibit characteristics associated more with noise than a target are filtered out. In addition, after completion of procedure 64, Doppler peak array 52 (see FIG. 4) identifies the maximum amplitudes recorded in map 28 for each Doppler bin 32.

Figure 8:
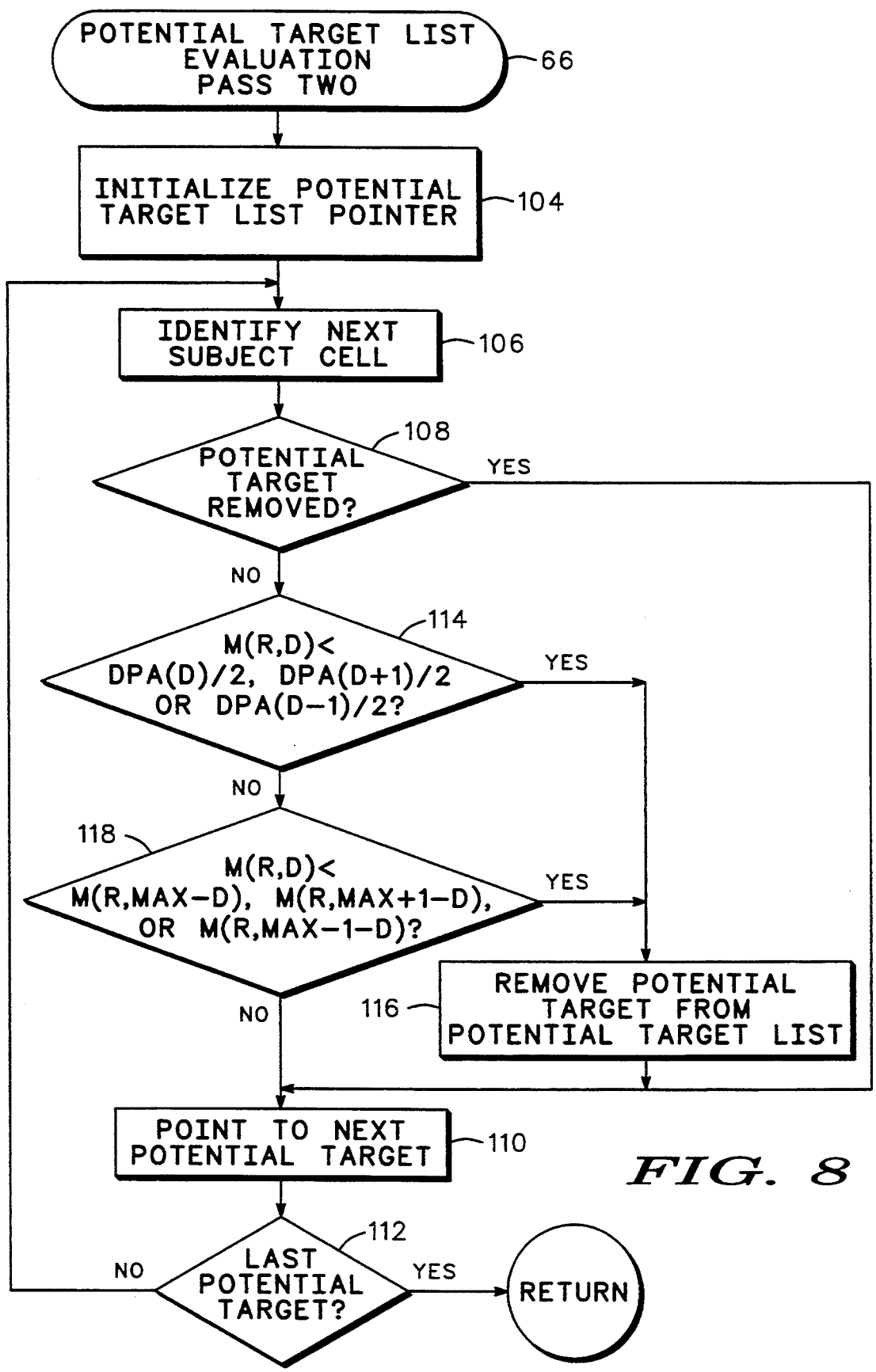
FIG. 8 shows a flow chart of a procedure that the radar system uses to make a second pass evaluation of the potential target list.

FIG. 8 shows a flow chart of procedure 66, which radar system 10 uses in making a second pass evaluation of potential target list 50 (see FIG. 3). Referring to FIGS. 2 and 8, procedure 66 performs a task 104 to initialize the potential target list pointer. The potential target list pointer may, for example, be set to point to the first item in potential target list 50 (see FIG. 3). After task 104, a task 106 identifies the next subject cell. The subject cell is the cell 34 whose range gate and Doppler bin coordinates (R,D) are stored at the location in potential target list 50 indexed by the potential target list pointer.

After task 106, a query task 108 determines whether the potential target list entry indicates a previously removed potential target. A potential target may have been previously removed through the performance of procedure 64, discussed above in connection with FIG. 7. If the potential target has already been removed, a task 110 adjusts the potential target list pointer to index the next potential target in list 50 (see FIG. 3). After task 110, a query task 112 determines whether the last potential target identified in list 50 has been evaluated by procedure 66. So long as additional potential targets remain to be evaluated, program control loops back to task 106 to evaluate the next subject cell. After the last potential target has been evaluated, program control leaves procedure 66 and proceeds to task 68 (see FIG. 5). Task 68 displays the potential targets remaining in potential target list 50 upon the completion of procedure 66.

Referring back to task 108, when a subject cell does not indicate a previously removed potential target, a query task 114 is performed. Task 114 generally determines whether the potential target is most likely the result of a range sidelobe, such as may result from multipathing in the return signal or pulse compression. Task 114 evaluates the amplitude M(R,D) of the subject cell with the peak amplitude for the subject cell's Doppler bin 32. This peak amplitude is referenced in FIG. 8 as DPA(D). Task 114 additionally evaluates M(R,D) with the peak amplitudes for adjacent Doppler bins 32, which FIG. 8 refers to as DPA(D+1) and DPA(D−1). Adjacent Doppler bins are used in the evaluation to detect situations where Doppler straddle and receiver noise may skew a range sidelobe into an adjacent Doppler bin.

Task 114 preferably does not compare the amplitude M(R,D) of the subject cell directly to the Doppler bin peaks DPA(D), DPA(D+1), and DPA(D−1). Rather, Task 114 compares M(R,D) to amplitude values that are greater than around $\frac{1}{3}$ of these Doppler bin peaks, and preferably around $\frac{1}{2}$ of these Doppler bin peaks. Thus, in the preferred embodiment, if the amplitude M(R,D) of the subject cell is less than $\frac{1}{2}$ of the peak amplitude for the subject cell's Doppler bin, or less than $\frac{1}{2}$ of the peak amplitude for an adjacent Doppler bin, the potential target is considered to be a range sidelobe phenomenon and passive clutter. In this situation, a task 116 removes the potential target from potential target list 50 (see FIG. 3). After task 116, program control proceeds to task 110 to evaluate the next subject cell.

Those skilled in the art will appreciate that in some situations the filtering performed by task 114 may mistakenly remove targets from potential target list 50. This may occur when two spaced apart targets are at the same azimuth, same Doppler, and one target produces a much smaller return signal than the other. However, this masking of targets does not often occur, and is typically a short-lived phenomenon when it does occur. Accordingly, little is gained by preventing such target masking at the expense of increasing the chances of experiencing passive clutter resulting from range sidelobes.

When task 114 determines that the amplitude M(R,D) of the subject cell is at least as great as $\frac{1}{2}$ of the peak amplitude for its Doppler bin 32 or an adjacent Doppler bin 32, procedure 66 performs a query task 118. Task 118 generally determines whether the potential target is most likely the result of a target image, such as may result from a minor imbalance in radar receiver 18 (see FIG. 1). An image is characterized in map 28 as having a smaller amplitude than the target for which it is an image. Task 114 compares the amplitude M(R,D) of the subject cell with the amplitude of the cells where an image could appear.

In particular, an image could appear at a cell 34 having the same range gate 30 as the subject cell but spaced apart from the subject cell in Doppler. The amount of spacing depends upon the Doppler of the subject cell. In particular, the cell 34 where an image could appear is located at the difference between maximum Doppler 44 and the Doppler for the subject cell. However, due to Doppler straddle, an image could appear in the cells 34 adjacent to this image cell 34. Thus, if M(R,D) is less than M(R, MAX−D), less than M(R,MAX+1−D), or less than M(R, MAX−1,D), where "MAX" is the maximum Doppler 44 for map 28, the subject cell is presumed to be an image and is removed from potential target list 50 (see FIG. 3) through task 116. However, if M(R,D) is greater than or equal to M(R, MAX−D), greater than or equal to M(R, MAX+1−D), or greater than or equal to M(R,MAX−1−D), the subject cell is presumed to be a target and is left in potential target list 50. In this situation, program control proceeds to task 110 to evaluate the next subject cell.

Accordingly, on completion of procedure 66, passive clutter which are likely to have resulted from range sidelobes and target images has been removed from potential target list 50 (see FIG. 3). As shown in FIG. 5, upon the completion of procedure 66, the subject cells remaining in potential target list 50 are displayed during task 68, and CFAR processor 57 repeats its process for another range-Doppler map 28 (see FIG. 2).

In summary, the present invention provides an improved radar return signal processing method. A CFAR processing technique is provided which identifies spurious signals that are likely to be considered passive clutter. The present invention processes a range-Doppler map to distinguish targets from both active and passive clutter. In particular, the present invention processes the range-Doppler map to detect spurious signals that are likely to have been caused by range sidelobes, by a target image, and by noise.

The above description shows a procedure wherein the potential target list is formed by prioritizing the Doppler bins and then searching in range. The reverse procedure is also operational and is used in the preferred embodiment which discussion follows. In this case each range bin is processed independently, where the range pointer is incremented after searching through all Doppler bins at the given range.

Figure 9:
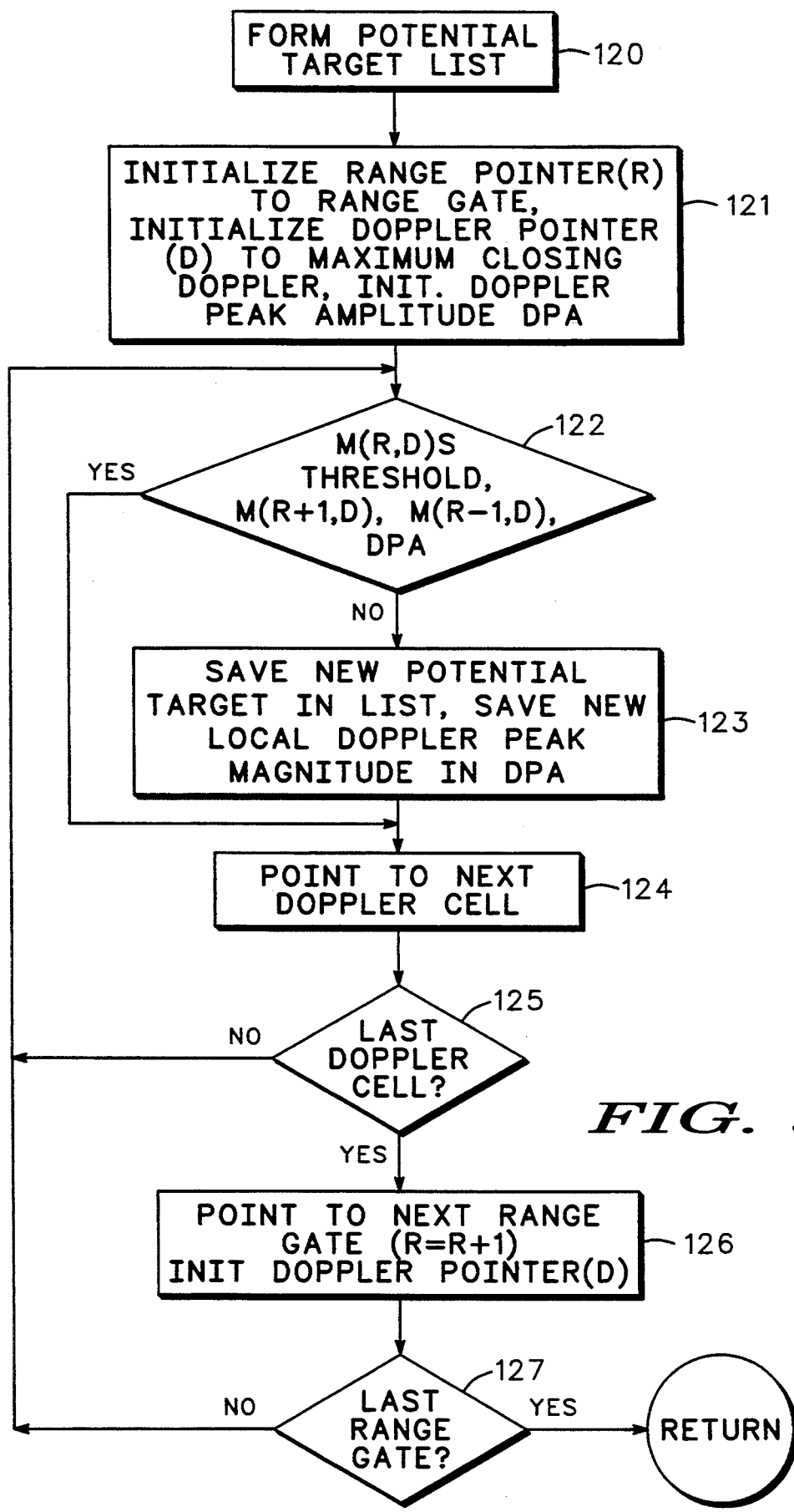
FIG. 9 shows a flow chart of a procedure for the radar for a Doppler prioritization method.

The processing algorithm, form potential target list 120, is shown in FIG. 9. Task 121 initializes the range pointer to the first range gate in 30; and initializes Doppler pointer D to Doppler bin 44; and initializes the Doppler peak amplitude, DPA 52. Query task 122 tests the Doppler cell 34 against the threshold, against one range 30 before and after, and the Doppler peak amplitude 52.

If the test cell satisfies the criteria, the potential target is saved in list 50 and the new Doppler peak amplitude is saved in DPA 52, task 123. Task 124 increments the Doppler pointer to the next Doppler cell. Task 125 determines whether the Doppler search is completed. Task 126 increments the range pointer to the next range cell 30 and re-initializes the Doppler pointer to Doppler cell 44. Query task 127 determines whether the last range gate 30 has been processed. If so the procedure returns. The output of the procedure is a potential target list 50 which is processed in subsequent passes one and two.

The present invention has been described above with reference to preferred embodiments. However, those skilled in the art will recognize that changes and modifications may be made in these preferred embodiments without departing from the scope of the present invention. For example, the particular order and organization of the tasks, processes, and procedures discussed above may be altered without substantially changing the jobs performed. These and other changes and modifications which are obvious to those skilled in the art are intended to be included within the scope of the present invention.

What is claimed is:

1. A method for distinguishing targets from active clutter and from passive clutter in a radar system, said method comprising the steps of:
   forming a range-Doppler map from a return signal generated by a radar receiver, said map having a multiplicity of map cells wherein each map cell characterizes an amplitude component of said return signal at one of a plurality of range gates and one of a plurality of Doppler bins;
   forming a list of potential targets from said map, said list identifying subject map cells whose amplitudes exceed a threshold value;
   evaluating amplitudes of said subject cells against amplitudes of selected ones of said map cells to identify subject cells whose amplitudes are likely to have resulted from passive clutter; and
   said evaluating step comprises, for each Doppler bin of said map, the step of comparing amplitudes of said subject cells with peak amplitudes for the Doppler bins within which said subject cells reside.

2. A method for distinguishing targets from active and passive clutter as claimed in claim 1 additionally comprising the steps of:
   adjusting said list to remove subject cells in response to said evaluating step; and
   indicating that targets reside at the cells identified by said list after said adjusting step.

3. A method for distinguishing targets from active and passive clutter as claimed in claim 1 wherein said comparing step comprises the step of identifying, for each Doppler bin, subject cells having amplitudes less than approximately ½ of said peak amplitude for the Doppler bin.

4. A method for distinguishing targets from active and passive clutter as claimed in claim 1 wherein said evaluating step comprises the step of determining whether the sum of the amplitude of a subject cell and the amplitude of a cell adjacent in said map to said subject cell at the same range gate as said subject cell does not exceed said threshold value by a predetermined amount.

5. A method for distinguishing targets from active and passive clutter as claimed in claim 4 wherein said predetermined amount is at least twice said threshold value.

6. A method for distinguishing targets from active and passive clutter as claimed in claim 4 wherein said determining step determines whether the sum of the amplitude of said subject cell and the amplitudes of two adjacent cells in said map at the same range gate as said subject cell does not exceed said threshold value by said predetermined amount.

7. A method for distinguishing targets from active and passive clutter as claimed in claim 1 wherein said evaluating step determines whether the amplitude of one of said subject cells is less than the amplitude of a map cell that resides substantially in the same range gate for said subject cell but in a Doppler bin where a target image for said subject cell could appear.

8. A method for distinguishing targets from active and passive clutter as claimed in claim 7 wherein:
   said forming a range-Doppler map step is configured to define a maximum Doppler; and
   said evaluating step comprises the step of identifying a cell from said map which resides at the same range as said subject cell but is offset in Doppler from said subject cell by the difference between said maximum Doppler and the Doppler bin for said subject cell to be said map cell where said target image could appear.

9. A method for distinguishing targets from active and passive clutter as claimed in claim 1 wherein said forming a list step comprises the step of calculating said threshold value in response to said amplitudes for a portion of said cells in said map, said portion being distributed throughout said entire map.

10. A method for distinguishing targets from active and passive clutter as claimed in claim 1 wherein said forming a list step comprises the step of calculating said threshold value in response to an average of said amplitudes in said map and in response to the variance in amplitude from said average exhibited among said amplitude values in said map.

11. A method for distinguishing targets from active and passive clutter as claimed in claim 1 wherein said forming a list step comprises the step of selecting a map cell wherein said selected map cell has an amplitude greater than the amplitudes of adjacent map cells in the same range gate and an amplitude greater than amplitudes of adjacent map cells in the same Doppler bin.

12. A method for distinguishing targets from active and passive clutter as claimed in claim 1 wherein:
said evaluating step comprises, for each of said subject cells, the step of comparing said subject cell's amplitude against amplitudes for map cells residing in the same Doppler bin as said subject cell but at range gates spaced a predetermined distance away from said subject cell in said map to determine whether said subject cell fails to exhibit a substantial amplitude peak for its Doppler bin; and
said method additionally comprises the step of adjusting said list to remove from said list a subject cell that fails to exhibit said substantial amplitude peak for its Doppler bin.

13. A method for distinguishing targets from active and passive clutter as claimed in claim 12 wherein said comparing step comprises the step of determining that said subject cell fails to exhibit said substantial amplitude peak when its amplitude is approximately less than the sum of the amplitudes for at least two map cells residing in the same Doppler bin as said subject cell and spaced at least two range gates away from said subject cell.

14. A method for distinguishing targets from active clutter and from passive clutter in a radar system, said method comprising the steps of:
forming a range-Doppler map from a return signal generated by a radar receiver, said map having a multiplicity of map cells wherein each map cell characterizes an amplitude component of said return signal at one of a plurality of range gates and one of a plurality of Doppler bins;
forming a list of potential targets from said map, said list identifying subject cells whose amplitudes exceed a threshold value;
comparing, for each subject cell, amplitude of said subject cell with a peak amplitude for the Doppler bin within which said subject cell resides;
determining, for each subject cell, whether the sum of the amplitude of said subject cell and the amplitude of a cell adjacent in said map to said subject cell at the same range gate as said subject cell does not exceed said threshold value by a predetermined amount;
adjusting said list to remove subject cells in response to said comparing and determining steps; and
indicating that targets reside at the cells identified by said list after said adjusting step.

15. A method for distinguishing targets from active and passive clutter as claimed in claim 14 wherein said comparing step comprises the step of identifying subject cells having amplitudes less than approximately $\frac{1}{3}$ of said peak amplitude for the Doppler bins within which said subject cells resides.

16. A method for distinguishing targets from active and passive clutter as claimed in claim 14 wherein said predetermined amount is at least twice said threshold value.

17. A method for distinguishing targets from active and passive clutter as claimed in claim 14 wherein said determining step determines whether the sum of the amplitude of said subject cell and the amplitudes of two cells adjacent to said subject cell in said map at the same range gate as said subject cell do not exceed said threshold value by said predetermined amount.

18. A method for distinguishing targets from active and passive clutter as claimed in claim 14 wherein said forming a list step comprises the step of selecting a map cell wherein said selected map cell has an amplitude greater than the amplitudes of adjacent map cells in the same range gate and an amplitude greater than amplitudes of adjacent map cells in the same Doppler bin.

19. A method for distinguishing targets from active clutter and from passive clutter in a radar system, said method comprising the steps of:
forming a range-Doppler map from a return signal generated by a radar receiver, said map having a multiplicity of map cells wherein each map cell characterizes an amplitude component of said return signal at one of a plurality of range gates and one of a plurality of Doppler bins;
forming a list of potential targets from said map, said list identifying subject cells whose amplitudes exceed a threshold value;
comparing, for each subject cell, amplitude of said subject cell with a peak amplitude for the Doppler bin within which said subject cell resides;
determining, for each subject cell, whether the amplitude of said subject cell is less than the amplitude of a map cell that resides substantially in the same range gate for said subject cell but in a Doppler bin where a target image for said subject cell could appear;
adjusting said list to remove subject cells in response to said comparing and determining steps; and
indicating that targets reside at the cells identified by said list after said adjusting step.

20. A method for distinguishing targets from active and passive clutter as claimed in claim 19 wherein said comparing step comprises the step of identifying subject cells having amplitudes less than approximately $\frac{1}{3}$ of said peak amplitude for the Doppler bin within which said subject cell resides.

21. A method for distinguishing targets from active and passive clutter as claimed in claim 19 wherein:
said forming a range-Doppler map step is configured to define a maximum Doppler; and
said determining step comprises the step of identifying a cell from said map which resides at the same range as said subject cell but is offset in Doppler from said subject cell by the difference between said maximum Doppler and the Doppler bin for said subject cell to be said map cell where said target image could appear.

22. A method for distinguishing targets from active and passive clutter as claimed in claim 19 wherein said forming a list step comprises the step of selecting a map cell wherein said selected mad cell has an amplitude greater than the amplitudes of adjacent map cells in the same range gate and an amplitude greater than amplitudes of adjacent map cells in the same Doppler bin.

23. A method for distinguishing targets from active clutter and from passive clutter in a radar system, said method comprising the steps of:
forming a range-Doppler map from a return signal generated by a radar receiver, said map having a multiplicity of map cells wherein each map cell characterizes an amplitude component of said return signal at one of a plurality of range gates and one of a plurality of Doppler bins;

forming a list of potential targets from said map, said list identifying subject cells whose amplitudes exceed a threshold value;

determining, for each subject cell, whether the sum of the amplitude of said subject cell and the amplitude of a cell adjacent in said map to said subject cell at the same range gate as said subject cell does not exceed said threshold value by a predetermined amount;

evaluating, for each subject cell, whether the amplitude of said subject cell is less than the amplitude of a map cell that resides substantially in the same range gate for said subject cell but in a Doppler bin where a target image for said subject cell could appear;

adjusting said list to remove subject cells in response to said determining and evaluating steps; and indicating that targets reside at the cells identified by said list after said adjusting step.

24. A method for distinguishing targets from active and passive clutter as claimed in claim 23 wherein said predetermined amount is at least twice said threshold value.

25. A method for distinguishing targets from active and passive clutter as claimed in claim 23 wherein said determining step determines whether the sum of the amplitude of said subject cell and the amplitudes of two adjacent cells in said map at the same range gate as said subject cell does not exceed said threshold value by said predetermined amount.

26. A method for distinguishing targets from active and passive clutter as claimed in claim 23 wherein:

said forming a range-Doppler map step is configured to define a maximum Doppler; and said evaluating step comprises the step of identifying a cell from said map which resides at the same range as said subject cell but is offset in Doppler from said subject cell by the difference between said maximum Doppler and the Doppler bin for said subject cell to be said map cell where said target image could appear.

27. A method for distinguishing targets from active and passive clutter as claimed in claim 23 wherein said forming a list step comprises the step of selecting a map cell wherein said selected map cell has an amplitude greater than the amplitudes of adjacent map cells in the same range gate and an amplitude greater than amplitudes of adjacent map cells in the same Doppler bin.

28. A method for distinguishing targets from active clutter and from passive clutter in a radar system, said method comprising the steps of:

forming a range-Doppler map from a return signal generated by a radar receiver, said map having a multiplicity of map cells wherein each map cell characterizes an amplitude component of said return signal at one of a plurality of range cells and one of a plurality of Doppler bins;

forming a list of potential targets from said map, said list identifying subject cells whose amplitudes exceed a threshold value;

comparing, for each subject cell, amplitude of said subject cell with a peak amplitude for the range cell within which said subject cell resides;

determining, for each subject cell, whether the sum of the amplitude of said subject cell and the amplitude of a cell adjacent in said map to said subject cell at the same Doppler bin as said subject cell does not exceed said threshold value by a predetermined amount;

adjusting said list to remove subject cells in response to said comparing and determining steps; and indicating that targets reside at the cells identified by said list after said adjusting step.

* * * * *